United States Patent [19]
Carper et al.

[11] Patent Number: 5,632,063
[45] Date of Patent: May 27, 1997

[54] COUNTERBALANCING MECHANISM FOR AN OVERHEAD DOOR

[75] Inventors: Kenneth E. Carper, Madeira; Alan R. Leist, Cincinnati; Tony Y. Lin, Mason; George S. Carper, Milford; Thomas E. Agin, Cincinnati, all of Ohio

[73] Assignee: Clopay Building Products Company, Inc., Cincinnati, Ohio

[21] Appl. No.: 262,135

[22] Filed: Jun. 16, 1994

[51] Int. Cl.⁶ ............................................. E05F 1/08
[52] U.S. Cl. ................... 16/198; 16/DIG. 1; 16/DIG. 7; 160/191
[58] Field of Search ........................... 160/191, 192, 160/318, 201; 49/200; 185/39, 44; 16/197, 198, DIG. 1, DIG. 7; 267/277

[56] References Cited

U.S. PATENT DOCUMENTS

| | | |
|---|---|---|
| 1,183,254 | 5/1916 | Tony . |
| 1,992,006 | 2/1935 | Greegor . |
| 2,032,951 | 3/1936 | Pixley . |
| 2,083,467 | 6/1937 | Morris . |
| 2,097,242 | 10/1937 | Robinson . |
| 2,314,015 | 3/1943 | Parsons . |
| 2,630,597 | 3/1953 | Robinson . |
| 2,660,753 | 12/1953 | Moler . |
| 2,786,231 | 3/1957 | Robinson . |
| 2,932,057 | 4/1960 | Pemberton . |
| 3,047,905 | 8/1962 | Nobes ................................. 16/197 |
| 3,412,423 | 11/1968 | Binns . |
| 3,635,277 | 1/1972 | Bahnsen . |
| 3,921,761 | 11/1975 | Votroubek et al. . |
| 4,191,237 | 3/1980 | Voege . |
| 4,681,307 | 7/1987 | Leonard . |
| 4,731,905 | 3/1988 | Milano et al. . |
| 4,882,806 | 11/1989 | Davis . |
| 4,930,182 | 6/1990 | Eichenberger . |
| 4,981,165 | 1/1991 | Miller et al. . |
| 5,036,899 | 8/1991 | Mullet . |
| 5,239,777 | 8/1993 | Husselton . |
| 5,275,223 | 1/1994 | Magro et al. . |
| 5,419,010 | 5/1995 | Mullet ................................. 160/191 X |

OTHER PUBLICATIONS

Brochure, "The Counterbalance Evolution", Wayne® Dalton, Mt. Hope, Ohio 44660, ©1993, Wayne–Dalton Corp.

Primary Examiner—Blair Johnson
Attorney, Agent, or Firm—Wood, Herron & Evans, L.L.P.

[57] ABSTRACT

An overhead door apparatus utilizing a torsion spring counterbalancing mechanism. The counterbalancing mechanism includes a worm drive ring-shaped gear winding mechanism for setting the appropriate torque or number of winds in the spring. A counting mechanism is provided to indicate to the installer the number of winds being given to the spring. The ring-shaped gear is a spur gear which is formed integrally with the fitting or cone which attaches by way of a threaded connection with one end of the spring. Means are also provided for accommodating spring growth and contraction during winding and unwinding using the winding mechanism and during normal raising and lowering of the door. A spring clip gear retainer is disclosed for preventing rotation or creep of the worm drive gear and spur gear during normal raising and lowering of the door.

38 Claims, 3 Drawing Sheets

COUNTERBALANCING MECHANISM FOR AN OVERHEAD DOOR

BACKGROUND OF THE INVENTION

The present invention generally relates to overhead doors of the type utilizing one or more counterbalancing torsion springs and, more particularly, relates to the torsion spring counterbalancing mechanism generally associated with such overhead doors as well as a winding mechanism for setting the counterbalancing force of the spring.

Overhead doors generally require a counterbalancing force which enables the door to be more easily moved between opened and closed positions either manually or by way of a powered opening device. Often, overhead door systems rely on one or more torsion springs for providing this counterbalancing force. These torsion springs must be wound during the installation of the garage door assembly such that they are provided with the necessary preset torque. Many systems require the installer to wind the spring manually by using a rod to rotate the free end of the spring with respect to a fixed end thereof and, after an appropriate number of turns, rigidly securing the free end of the spring to the torsion shaft of the overhead door assembly. This type of system is not only difficult to install but is also quite dangerous to install and remove due to the possibility of the installer inadvertently releasing the bar and being injured as a result. Thus, installers must be quite experienced to avoid the dangers involved with these prior systems.

Overhead door assemblies have been proposed in the past which have addressed problems involving manual winding of torsion springs. For example, certain gear systems have been disclosed for winding the torsion spring. Such worm gear arrangements are shown in U.S. Pat. Nos. 3,921,761; 4,882,806 and 4,981,165. In each of these systems, a ring-shaped worm gear is operatively coupled to the free end of the torsion spring and is rotated by way of a mating worm drive gear or pinion which may be driven either manually or with a power tool by the installer. Thus, rotation of the ring-shaped worm gear also rotates or winds the torsion spring to set the appropriate amount of torque in the spring.

These gear systems, however, each have disadvantages which make them impractical to use in all but the most elaborate and expensive overhead door assemblies. For example, these prior gear systems require a number of precision machined parts and further require very precise, and costly, assembly procedures. For example, the worm drive gear in each is designed to rotate about an axis perpendicular to the axis of the ring-shaped mating gear. Thus, the gear teeth on each gear must be precisely machined and matched to establish this perpendicular relationship. Additionally, the gear systems shown in U.S. Pat. Nos. 3,921,761 and 4,882,806 are designed such that the worm drive gear is oriented horizontally along an axis perpendicular to the overhead door. This makes it difficult for the installer to easily and safely apply a tool to the worm drive gear during the winding process. The worm drive gear disclosed in U.S. Pat. No. 4,981,165 is also shown in a horizontal orientation but also actually rotates with the torsion shaft and therefore this system includes the further undesirable possibility of leaving the worm drive gear in an even more inaccessible orientation. Also, each of the worm gear systems described in the above patents leaves open the possibility of undesirable rotation of the worm drive gear and ring-shaped gear and a resulting unwinding action of the torsion spring after the system has been wound. This may occur, for example, by the vibration caused during everyday operation of the overhead door. Finally, none of these prior systems provide an easy manner of identifying the number of turns that have been made in the torsion spring. Further disadvantages of these systems will become more apparent upon review of the advantageous features of the present invention.

Overhead door assemblies prior to the present invention have also utilized torsion springs in which adjacent coils thereof abut one another when the spring is in a normal, unwound resting state. In other words, these springs have been manufactured in the past such that there is no gap left between adjacent coils. Therefore, during the initial winding process and during operation of the overhead door, frictional force arising as the result of rubbing action between adjacent coils of the shrinking spring must be overcome by the system. This places the system under additional stresses and strains which must be borne by the spring itself as well as the user or the powered door opener, each of which is undesirable. The additional stress that the abutting coils place on the spring may lead to a shorter effective spring life and/or premature failure of the spring.

Many prior systems not only use springs having abutting coils but further fail to provide for the growth and contraction of the torsion spring during the operations of initially winding the spring and of spring unwinding and winding during raising and lowering of the door. Other systems that do provide some means for accommodating spring growth and contraction tend to be suitable for one operation but not the other or tend to be complicated systems which are impractical in many applications, such as residential applications, and which create new problems associated with their complicated design and installation procedures.

A need in the art therefore exists for improvements which, for example, allow easier installation of overhead door systems as well as improved operation thereof while maintaining low overall costs and a long useful life.

SUMMARY OF THE INVENTION

To address various problems apparent in the art, the present invention provides overhead door apparatus including a counterbalancing mechanism constructed in accordance with various embodiments as further described below. In a first preferred embodiment the apparatus includes a torsion shaft mounted for rotation between first and second stationary supports and a torsion spring having a first end operatively fixed to the torsion shaft such that the first end rotates with the torsion shaft and moves axially along the torsion shaft during raising and lowering of the overhead door. The axially moving end of the spring accommodates spring growth and contraction during any and all winding and unwinding operations of the spring. The torsion spring has a second end operatively connected to a winding mechanism, mounted to the first support and functioning to wind the second end thereof with respect to the first end while the door is held stationary in the down or closed position.

Two alternatives are disclosed for allowing the first end of the spring to move axially along and yet rotate with the torsion shaft to thereby accommodate spring growth and contraction. First, a sliding spring fitting or cone is disclosed which includes a key slidably received by a keyway in the torsion shaft. Preferably, the keyway comprises a pair of deformed, elongate depressions in the torsion shaft and the key comprises a complementary pair of protuberances within the sliding cone. The second alternative adds roller elements to the fitting or cone which are designed to reduce the friction and any possible binding between the fitting or cone and the torsion shaft. Each of these alternatives allow the transfer of torque to occur between the spring and the torsion shaft while accommodating the growth and shrinkage of the spring in an axial direction.

Another manner of accommodating spring growth and contraction in accordance with the present invention is through the provision of a torsion spring with a preset gap between adjacent coils of the spring when it is in its unwound, resting state. This gap is calculated to substantially accommodate the added number of coils which result from the initial winding process during installation. The advantage of this method of accommodating spring growth resides in its relatively low cost when compared to the moving cone embodiments.

In accordance with another aspect of the invention, a winding mechanism is incorporated into the stationary support structure at the second end of the spring. The winding mechanism allows the second end of the spring to be easily rotated or wound with respect to the non-rotating first end thereof. Specifically, the winding mechanism includes a ring-shaped gear rotatably supported by the first stationary support and operatively affixed to the second end of the torsion spring such that rotation of the ring-shaped gear rotates the second end of said spring with respect to the first end of said spring. A worm drive gear is also rotatably supported by the first support and includes outer threads or teeth that mesh with the teeth of the ring-shaped gear. The ring-shaped gear is preferably a spur gear formed integrally with a spring cone or fitting on which the second end of the spring is threaded. Not only is the use of a spur gear extremely cost effective and universal in the sense that it is neither right or left-hand dedicated, it also allows for significantly more "play" or "forgiveness" during installation than would conventional worm gear systems in which components thereof are designed to be in nearly perfect alignment with each other.

The apparatus further includes a gear retainer which engages the winding mechanism to restrain the spur gear and worm drive gear from rotating during normal operation of the door. However, the gear retainer is disengageable from the gear system to allow operation of the gear system during winding and unwinding of the torsion spring, respectively, during installation and removal thereof. The gear retainer automatically engages and disengages the worm drive gear upon removal and application of an appropriate tool used to rotate the worm drive gear. During normal operation of the door, the gear retainer prevents so-called "creep" or undesirable rotation of the worm drive gear, spur gear and any resulting unwinding of the torsion spring from its pre-torqued, wound state.

In a further aspect of the invention, the various components of the counterbalancing mechanism are constructed and fixed in place such that the longitudinally directed thrust load of the torsion spring is not directed onto the sheet metal construction of the stationary support or mounting structure. Rather, this thrust load is borne by the torsion shaft which is placed under tension by the load and is much more able to bear the load than is the sheet metal support structure.

Finally, a counting mechanism is operatively connected to the ring-shaped gear to indicate the number of turns made in the torsion spring during the installation procedure. This is especially desirable when a direct view of the torsion spring is prevented by a cover provided for aesthetic purposes.

These and other advantages of the present invention will become more readily apparent upon review of the following detailed description of the preferred embodiments thereof taken in conjunction with the accompanying drawings.

DETAILED DESCRIPTION OF THE PREFERRED EMBODIMENTS

Figure 1:
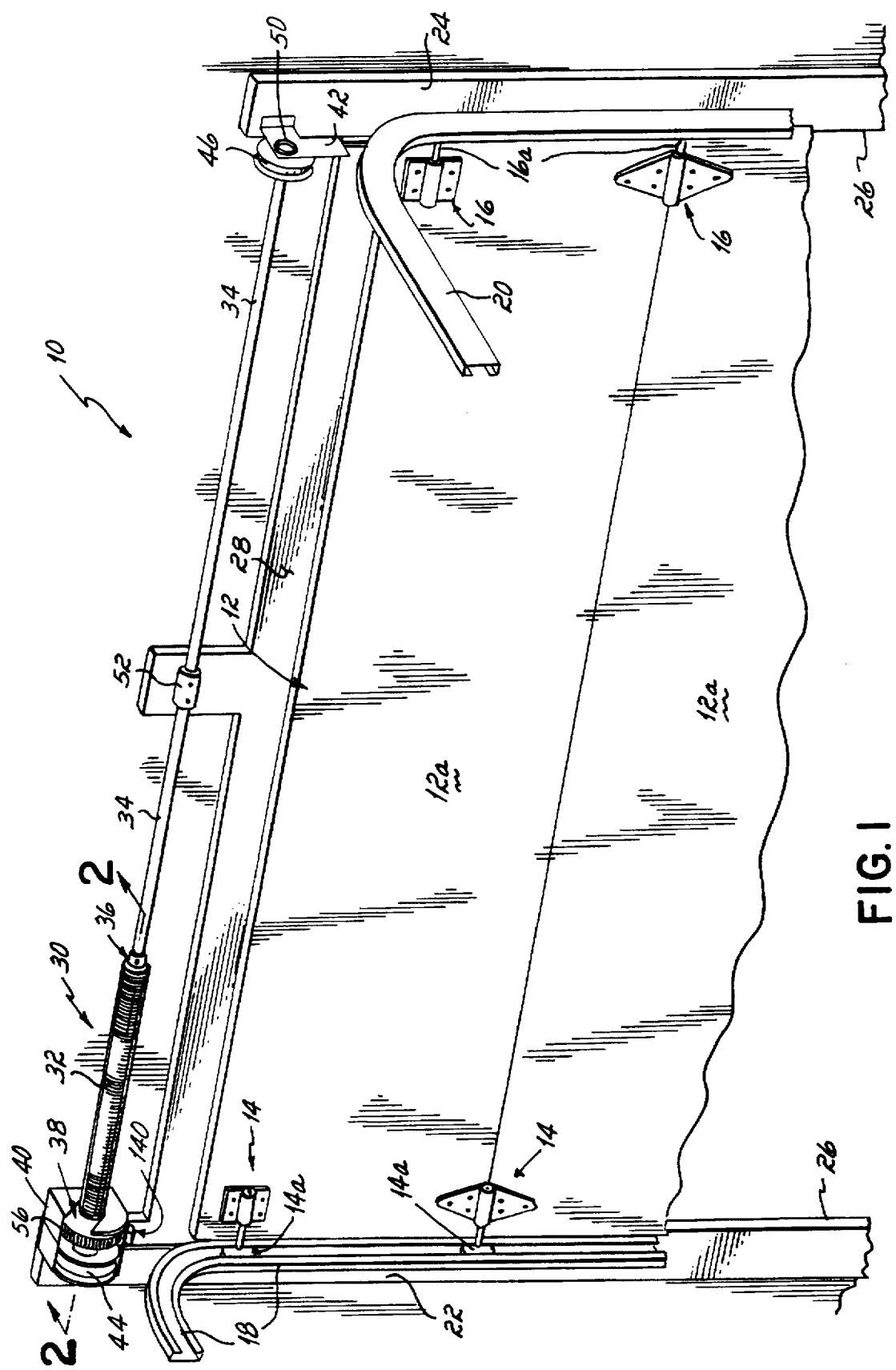
FIG. 1 is a diagrammatic perspective of an overhead door assembly with the door in a lowered, closed position and incorporating a first preferred embodiment of the counterbalancing mechanism of the present invention and showing the winding mechanism with an associated front housing portion and counting mechanism removed.

Referring first to FIG. 1, the present invention generally comprises an overhead door system 10, such as a residential garage door or a commercial overhead door system, including a door 12 which may be conventionally made up of a plurality of horizontal, hinged panels 12a. Panels 12a each have roller assemblies 14, 16 affixed at opposite ends thereof, at least some of which are associated with the door panel hinges, for example, and which include rollers 14a, 16a riding in a pair of curved tracks 18, 20 as is conventional in the art. Tracks 18, 20 are rigidly affixed to side frame members 22, 24 which, in part, define a door opening 26. As is conventional, tracks 18, 20 may also be supported from structure (not shown) disposed above frame members 22, 24. Door opening 26 is further defined by upper frame structure 28.

Figure 2:
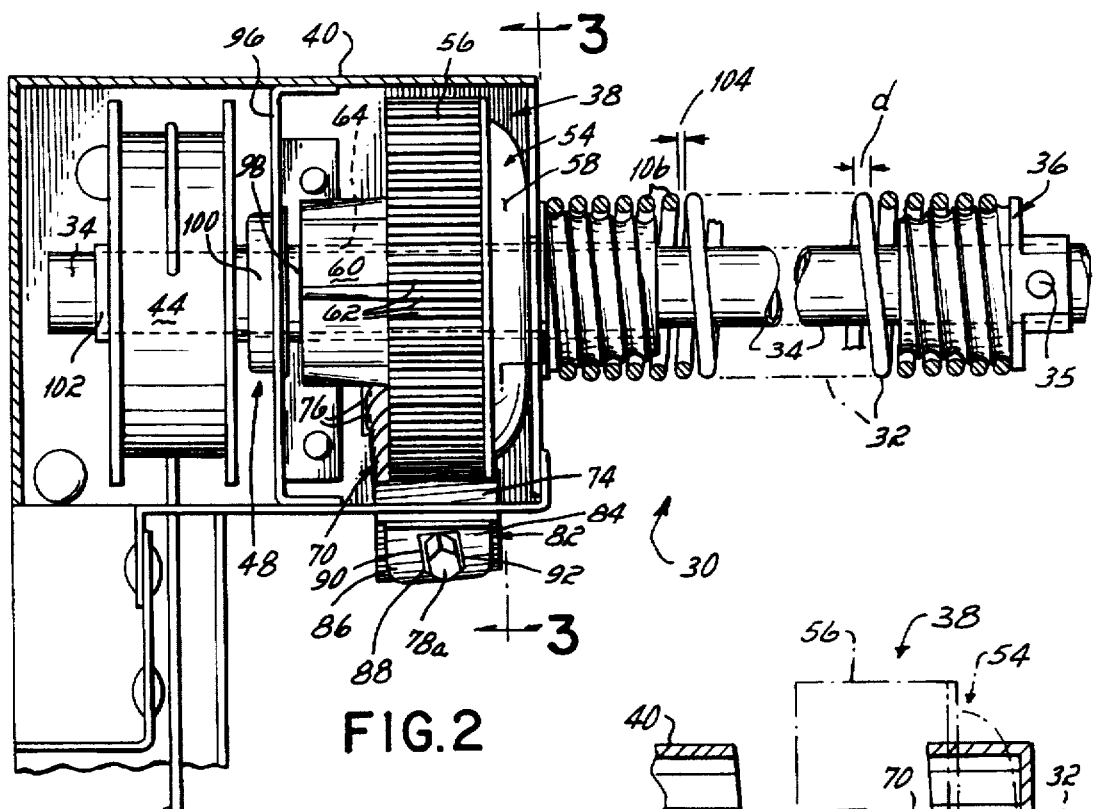
FIG. 2 is a cross sectional view of the counterbalancing mechanism taken along line 2—2 of FIG. 1 but shown with the torsion spring thereof in the unwound state thereof corresponding to a raised, opened door.

As further shown in FIG. 1, door 12 may be raised and lowered to respectively expose and close door opening 26 and, to assist in such raising and lowering operations, a counterbalancing mechanism 30 is used and constructed in accordance with the present invention. Counterbalancing mechanism 30 generally includes a torsion spring 32 which has a first end operatively connected to a torsion shaft 34 by being threaded onto an inner spring fitting or cone 36 in a conventional manner. Cone 36 is rigidly affixed to torsion shaft 34 by a plurality of set screws 35, one of which is shown in FIG. 2. Torsion spring is operatively connected to a winding mechanism 38 at a second end thereof. The winding mechanism 38 is supported by a first fixed support 40 which comprises a housing constructed of sheet metal and rigidly fastened, as with bolts (not shown), to the frame structure 22 adjacent to door opening 26. A second fixed support 42 is located at the opposite end of torsion shaft 34 and is likewise constructed of sheet metal and rigidly fastened to the frame structure 24 adjacent to door opening 26. Torsion shaft 34 is supported for rotation between fixed supports 40, 42 and further includes drums 44, 46 rigidly affixed, as with set screws (not shown), to torsion shaft 34 for rotation therewith in a conventional manner. Cables extend from drums 44, 46 and are connected to the bottom of the overhead door 12 in a conventional manner. Torsion shaft 34 is connected to fixed support 40 by way of a roller bearing 48 (FIG. 2), as further discussed below, and to fixed support 42 by way of a second roller bearing 50. Bearings 48, 50 allow rotation of torsion shaft 34 during operation, i.e., raising and lowering, of door 12. Torsion shaft 34 has a two-piece construction with the pieces being connected to each other at a central location by a coupling 52.

Figure 3:
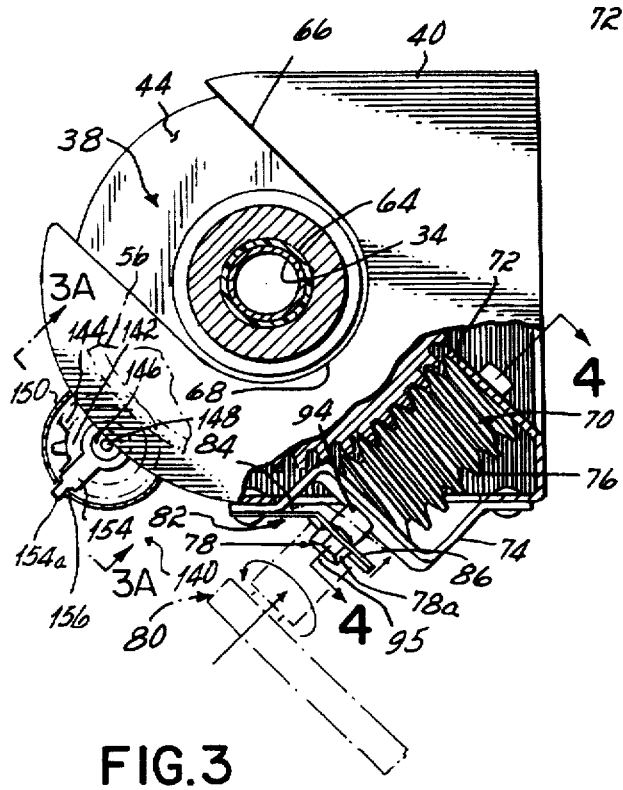
FIG. 3 is a partially fragmented view of the torsion spring winding mechanism of the present invention taken generally along line 3—3 of FIG. 2 but additionally showing a front housing portion and counting mechanism in place.
Figure 4:
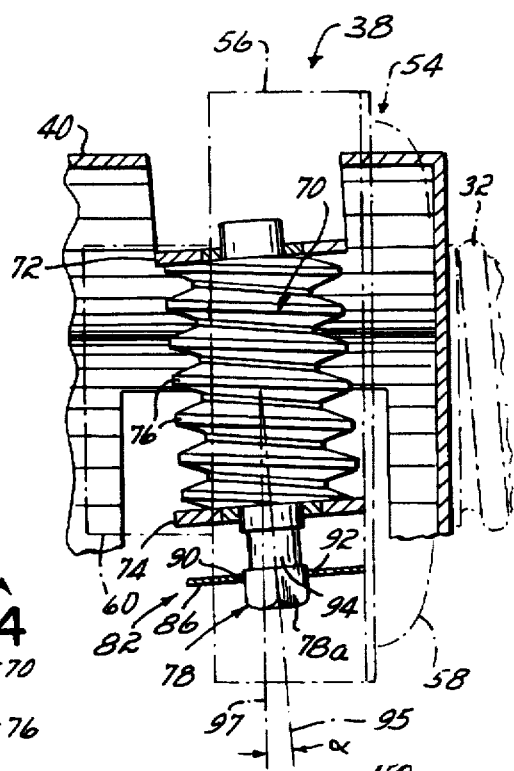
FIG. 4 is a cross sectional view of the torsion spring winding mechanism taken generally along line 4—4 of FIG. 3.

Referring now to FIGS. 2—4, winding mechanism 38 includes a gear cone 54 which incorporates a ring-shaped gear 56 thereon as well as a cone portion 58 and a hub portion 60. Gear 56, cone portion 58 and hub portion 60 are integrally formed with one another, preferably by being die cast as a single unit from aluminum. Ring shaped gear 56 is preferably a spur gear, that is, gear 56 includes straight, peripheral teeth 62 which are both parallel to one another and parallel to the axis of rotation of gear 56. This aspect of the invention is the feature that allows the entire gear cone 54, including gear 56 incorporated therein, to be die cast in a single molding operation. The use of a spur gear 56 also causes the gear cone 54 to be "universal" in the sense that it may be used on either end of torsion shaft 34.

As best shown in FIG. 3, gear cone 54 is mounted for rotation within housing 40 and about torsion shaft 34. In this regard, a cylindrical Nylon bushing 64 is press fit within gear cone 54. Torsion shaft 34 rotates with respect to gear cone 54 and its inner bushing 64. Specifically, and as further discussed below, gear cone 54 and bushing 64 rotate about torsion shaft 34 during the initial winding of torsion spring 32 and torsion shaft 34 rotates within gear cone 56 and bushing 64 during raising and lowering operations of door 12. As further shown in FIG. 3, gear cone 56 is received by a slot 66 in housing 40 but remains spaced from an inner end 68 of slot 66 such that housing 40 does not prevent free rotation thereof during a winding operation.

Winding mechanism 38 further includes a worm drive gear 70 mounted for rotation within housing 40 between brackets 72, 74. Worm drive gear 70 includes outer, helical teeth or threads 76 which mesh with teeth 62 of spur gear 56. Rotation of worm drive gear 70 in one of the two possible directions will therefor rotate gear cone 54 in a corresponding direction to either wind or unwind torsion spring 32. To facilitate rotation of worm drive gear 70, a driving head 78, engageable by a suitable tool, is provided on an exposed end thereof. In the preferred embodiment, driving head 78 includes a hex portion 78a which may be engaged by a socket tool 80 (FIG. 3) and rotated either manually or in a power assisted manner such as by being pneumatically driven.

In accordance with another aspect of this invention, a gear retainer 82 is provided for preventing rotation of worm drive gear 70 and gear cone 54 when hex portion 78a is not engaged by tool 80 but for allowing rotation thereof when hex portion 78a is engaged by tool 80. Specifically, gear retainer 82 comprises a resilient spring clip 84 which is rigidly secured to housing 40 and includes an angled portion 86 which normally engages the hex portion 78a of head 78 in the clip's unbiased state, shown in solid in FIG. 3. As best illustrated in FIGS. 2 and 4, portion 86 of clip 84 includes an aperture 88 through which hex portion 78a of head 78 extends. Aperture 88 has at least two straight edges 90, 92 that engage hex portion 78a of head 78 to normally prevent or restrain any rotation of worm drive gear 70 and therefore of gear cone 54 during normal operation of door 12. During winding and unwinding of the spring with the door maintained stationary, however, tool 80 is pushed onto hex portion 78a of head 78 and this pushes portion 86 of clip 84 to the position shown in phantom in FIG. 3 such that aperture 88 and, more specifically, edges 90, 92 are in alignment with a stepped down or recessed portion 94 of head 78. When aperture 88 is aligned about stepped down or recessed portion 94, hex portion 78a of head 78 is free to rotate and worm drive gear 70 may therefore also be rotated to either wind or unwind spring 32.

As illustrated in FIG. 3, worm drive gear 70 extends along an axis 95 which is ideally fixed at approximately 45° to horizontal and extends into the plane of door opening 26 (FIG. 1) with the drive head 78 directed downwardly and inwardly into the interior of, for example, the garage. More generally, for easy access by an installer standing on the ground below winding mechanism 38, worm drive gear 70 is preferably oriented between an approximately vertical orientation and approximately the 45° position shown in FIG. 3. As further shown in FIG. 4, the axis 95 of worm drive gear 70 is also oriented at a slight angle α with respect to a plane 97 which is perpendicular to door opening 26 and to the axis of rotation of spur gear 56. Angle α substantially corresponds to the lead angle of the teeth or threads 76 of worm drive gear 70 and may, for example, be approximately 4°. Angle e results from the angled teeth or threads 76 meshing with the straight, parallel teeth 62 of spur gear 56 which extend parallel to the axis of rotation of spur gear 56. This aspect of the invention allows even easier access to the head 78 of worm drive gear 70 by the installer since the head 78 of worm drive gear 70 is not only angled downwardly toward the installer, but also inwardly toward the center of door opening 26.

Referring again to FIG. 2, housing 40 further includes a bearing plate 96 into which bearing 48 is press fit. Inner race 98 of bearing 48 receives and rotates with torsion shaft 34 and with respect to outer race 100 which remains stationary. Inner race bears against bushing 64 (FIG. 3) on one side and against hub 102 of drum 44 on the other side. Therefore, as drum 44 and its hub 102 are rigidly affixed to torsion shaft 34 at one end of counter balancing mechanism 30 and inner spring fitting or cone 36 is affixed to torsion shaft 34 at the opposite end, there is no thrust load or, in other words, there is virtually no longitudinally directed force on the sheet metal housing 40 and bearing plate 96. In this regard, torsion shaft 34 bears virtually all of this thrust load since, by design, it is placed under tension between the two rigid, e.g., set screw, connections respectively made between torsion shaft 34 and drum 44 at one end and between torsion shaft 34 and fitting 36 at the other end. For this reason, the longitudinally directed stresses are experienced by torsion shaft 34 rather than by housing 40 and bearing plate 96 which are made of sheet metal much less able to handle such stress over time than the tubular torsion shaft 34. Also, due to this design bearing 48 does not need to be a relatively expensive thrust bearing but need only be a simpler, less expensive roller bearing.

In another aspect of the first embodiment of this invention, torsion spring 32 is formed with a specifically determined gap 104 formed between adjacent coils 106 when the spring 32 is in a resting or unwound state. Gaps 104 allow additional coils 106 to be added to the spring during the initial winding process and during the winding that occurs while lowering door 12. Since adjacent coils 106 do not touch as spring 32 is wound and as additional coils are added, there is no need to overcome the additional frictional forces encountered with conventional springs having abutting coils. It has been found that the specific gap must be formed precisely in order to retain the necessary rigidity and performance of the spring across many varied applications. In accordance with the present invention, the size of each gap 104 between adjacent coils 106 is generally determined by the following formula:

$$\text{Gap} = \frac{(d) \times (\Delta N) \times (f_o)}{N}$$

where:

d=diameter of coil spring wire
$\Delta N$=number of coils added during winding
$f_o$=overtravel factor
N=total number of coils of unwound spring For a residential application, a typical spring wire diameter (d) may be ¼" and a typical number of coils added during winding ($\Delta N$) may be approximately 10 while a typical total number of coils (N) may be about 100. Ideally, gaps 104, each being the same width, would be calculated such that at the end of an initial winding operation to set the required torque in the spring 32, adjacent coils 106 would just abut one another. However, an overtravel factor $f_o$ has been included in the above formula to allow for some overwinding of the spring during installation of the counterbalancing mechanism 30. The overtravel factor will be approximately in the range of 1.1–2.0 and is preferably about 1.25. This factor results in a gap that is somewhat greater than ideal but that is desirable to allow for an installer to "over-wind" the spring to some extent without causing adjacent coils 106 to rub against one another as a result of such over-winding. Therefore, as one example, a residential torsion spring might have gaps 104 between adjacent coils 106 calculated as follows:

$$\text{Gap} = \frac{(.25) \times (10) \times (1.25)}{100} = 0.03125" = 1/32"$$

These gaps will vary from application to application, however, using the above formula of the present invention, an appropriate gap 104 may be calculated for each application such that the coils added during winding are accommodated while maintaining the structural integrity and performance of the spring. For many applications, especially residential applications, the gaps will be between about 1/64" and 1/32".

Figure 5:
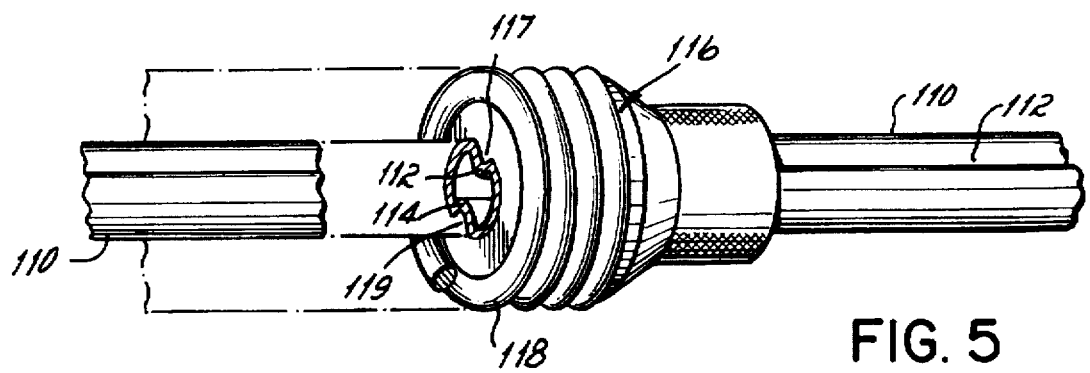
FIG. 5 is a perspective view of a second embodiment of the spring end fitting and torsion shaft of the counterbalancing mechanism.

Another manner of accommodating spring growth and contraction according to the present invention is illustrated in FIG. 5. This figure only shows the spring end fitting or cone of the counterbalancing mechanism as well as a portion of the torsion shaft thereof. The remaining portions of the counterbalancing mechanism are preferably identical to those of counterbalancing mechanism 30 shown in FIGS. 1–4. According to this embodiment of the invention, the torsion shaft 110 is shaped with two, diametrically opposite elongate depressions 112, 114 which extend along the length of the tubular shaft 110. Torsion shaft 110 receives a spring end fitting or cone 116 in a manner which allows end fitting or cone 116 to move axially or slide along torsion shaft 110 but not to rotate about torsion shaft 110. Specifically, end fitting or cone 116 includes two oppositely directed protuberances 117, 119 which complement the depressions 112, 114 and mate therewith in a manner similar to key and keyway connections.

An outer end of spring 118 is fixed to a stationary support, such as to the winding mechanism 38 and housing 40 as shown in FIGS. 1–3 while the inner end of spring 118 is threaded onto cone 116 in a conventional manner. Cone 116 is free to slide along torsion shaft 110 to accommodate growth and contraction of spring 118 during initial winding thereof as well as during raising and lowering of the overhead door. Significantly, end fitting or cone 116 is not fixed to shaft 110 with a set screw as is conventional but does rotate therewith because of the unique key/keyway type connection. A conventional spring having abutting coils in its unwound state may be utilized in this embodiment as the use of a sliding end cone accommodates the coils added during winding processes.

Figure 6:
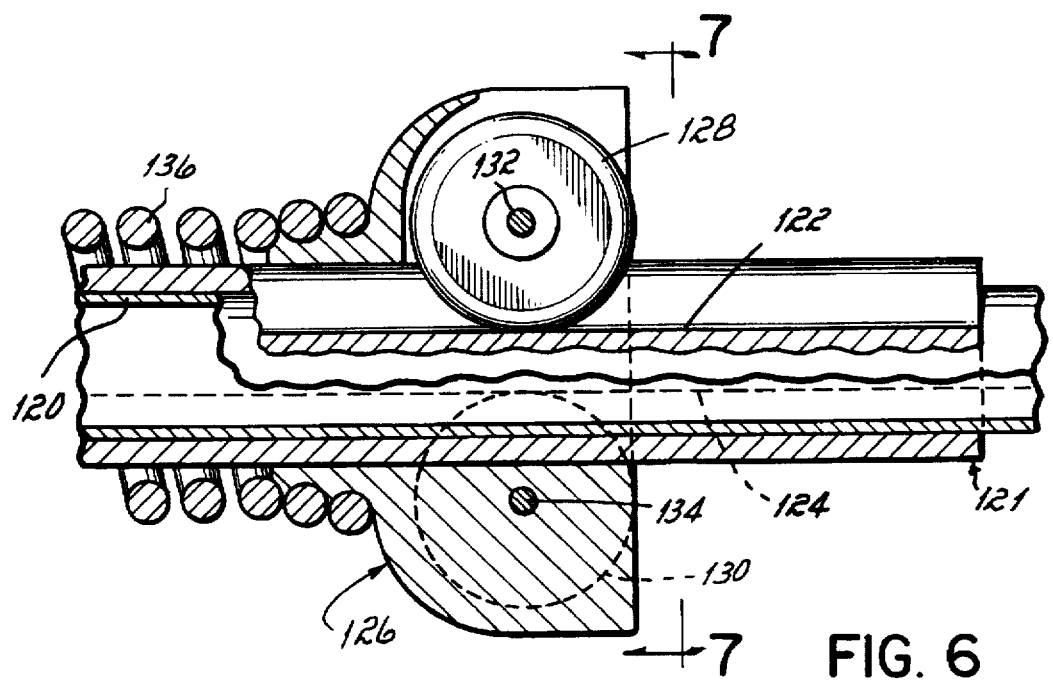
FIG. 6 is a cross sectional view in side elevation of a third embodiment of the spring end fitting and torsion shaft of the counterbalancing mechanism; and, FIG. 7 is a cross section view of the embodiment shown in FIG. 6 taken along line 7—7.
Figure 7:
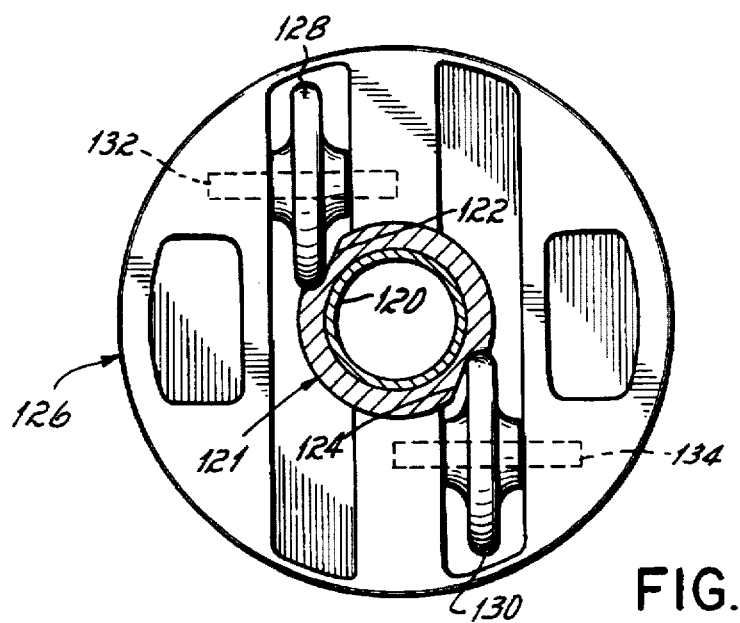

FIGS. 6 and 7 illustrate a still further embodiment of an axially movable inner fitting or end cone which is identical in purpose and design to the fitting or cone 116 shown in FIG. 5 except that means are provided for reducing sliding friction between the end cone and the torsion shaft. More particularly, a torsion shaft 120 mounts a sleeve having two, oppositely facing elongate recesses or grooves 122, 124 which extend an appropriate length along shaft 120 to accommodate growth and contraction of spring 136. The sleeve 121 of torsion shaft 120 receives a spring end fitting or roller cone 126 in a manner which allows end fitting or roller cone 126 to roll axially along torsion shaft 120 but not to rotate about torsion shaft 120. Specifically, end fitting or roller cone 126 includes friction reducing rolling elements preferably taking the form of two rollers 128, 130 which register within and roll along the respective recesses 122, 124. Rollers 128, 130 are fixed within roller cone 126 by respective pins 132, 134 about which rollers 128, 130 rotate.

An outer end of spring 136 is fixed to a stationary support, such as to the winding mechanism 38 and housing 40 as shown in FIGS. 1–3 while the inner end of spring 136 is threaded onto cone 126 in a conventional manner. Cone 126 rolls along the sleeve 121 of torsion shaft 120 to accommodate growth and contraction of spring 136 during initial winding thereof as well as during raising and lowering of the overhead door.

As mentioned above, the embodiment of FIGS. 6 and 7 is aimed at reducing the friction between the end cone and torsion shaft. Such undesirable friction might be present in the sliding cone 116 and torsion shaft 110 constructed in accordance with FIG. 5. It is also contemplated, however, that an anti-friction surface or coating may be used in the embodiment of FIG. 5 between the two relatively sliding components. This might comprise a coating of lubricated plastic or other anti-friction material on the outside surface of torsion shaft 110 or an insert of lubricated plastic or other anti-friction material within cone 116.

Figure 3A:
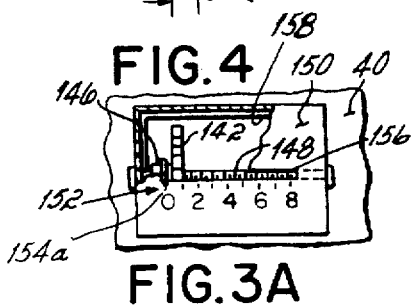
FIG. 3A is a cross-sectional view of the torsion spring winding mechanism taken along line 3A—3A of FIG. 3 to show details of the counting mechanism.

Returning now to FIG. 3 taken along with FIG. 3A, a counting mechanism 140 is provided with winding mechanism 38 in order to allow an installer to readily identify the number of turns being given to torsion spring 32 by way of tool 80 during installation of system 10. Counting mechanism 140 includes a counter gear 142 having a plurality of gear teeth 144 that extend through a window 158 in housing 40 and mesh with gear teeth 62 of gear 56. Counting gear 142 further includes a central, internally threaded hub 146 that receives an externally threaded, fixed rod 148. Threaded rod 148 is rigidly fixed at opposite ends thereof to a counting mechanism housing 150. Thus, as gear 56 is rotated by worm drive gear 70, counter gear 142 will rotate and, at the same time, translate along fixed threaded rod 148. Graduations 152 are provided on the outside of housing 150 to give a visual indication to the installer of the number of turns or winds. A pointer 154 is connected to the outside of hub 146 such that relative rotation is allowed between counting gear 142 and pointer 154 and gear 142. Pointer 154 has an end portion 154a that protrudes from a slot 156 in housing 150. End portion 154a points to a particular graduation or number 152 on the outside of housing 150 to indicate the number of turns in spring 32. It will be appreciated that other indicators may be provided instead of pointer 154 and graduations 152. For example, a counter wheel having numbers for indicating the number of turns might be substituted into counting mechanism 140 by one of ordinary skill.

In the preferred embodiment, counting gear 142 will have nine teeth while gear 56 will have forty-five teeth thus creating a ratio of 5:1. Every five turns of counter gear 142, end portion 154a of pointer 154 will point to another graduation thus indicating another turn of gear 56 and spring 32. Typically, torsion springs such as spring 32 will require approximately seven to eight turns. It will be appreciated that other gear ratios may be chosen in conjunction with various thread pitches of rod 148. In all cases, the translation of counter gear 142 will never be greater than the width of gear 56.

Operation

Referring to FIG. 1, after the garage door 12 and counterbalancing mechanism 30 have been installed substantially as shown in FIG. I with the door 12 in a closed position, the installer simply engages drive head 78 of worm drive gear 70 with an appropriate tool 80 (FIG. 3) to disengage gear retainer 82 and then rotates worm drive gear 70 clockwise as viewed from the perspective of FIG. 2. This rotates gear cone 54 and winds spring 32, adding a number of coils equal to the number of turns of gear cone 54. When end portion 154a of pointer 154 reaches the required number of turns as indicated on the graduated scale 152, the installer stops turning worm drive gear 70. When tool 80 is disengaged, gear retainer and, more specifically spring clip portion 86 automatically springs back to restrain hex portion 78a of drive head 78 from rotating.

It should be noted that if adjacent coils were abutting or, in other words, touching when the winding process was started, then the spring would grow or lengthen by an amount corresponding to the number of coils added. However, with the present invention, this spring growth is accommodated through the use of the spring 32 having the preset gap 104 between adjacent coils 106 or by one of the two moving end fittings or cones 116 or 126 which replace fitting 36 when a spring having abutting coils is used. Spring growth and contraction is also accommodated during normal raising and lowering operations of door 12 by way of either the predetermined gaps 104 of spring 32 or by way of an axially moving end fitting or cone 116 or 126 as described above. Unwinding of the spring is accomplished in the same manner as winding except that the worm drive gear is rotated in a counterclockwise direction.

Although preferred embodiments of the invention have been detailed above, those of ordinary skill in the art will readily recognize modifications thereof and substitutions of various components which do not depart from the spirit of the invention. For example, although the embodiment of FIGS. 6 and 7 is shown with two rollers, it may alternatively be designed to have more or less than this number of rolling elements and may simply be comprised of a roller bushing which allows axial motion along the torsion shaft but not rotation about the torsion shaft. Also, it will be appreciated that an appropriate counting mechanism may be provided to count the number of revolutions of the gear cone and thereby count the number of coils added to the torsion spring during the initial winding process. It will further be appreciated that the relative positions of the adjacent drum and bearing may be reversed, at least on the end of the torsion shaft having the counterbalancing mechanism, such that the hub of the drum abuts the bushing of the gear cone to directly take the thrust load of the spring instead of indirectly taking this load by abutting the bearing. Thus, the drum may either directly or indirectly bear the thrust load and, in either event, this load will not be on the sheet metal support or housing. With these and other additions and modifications taken into consideration, it is the Applicant's intent to be bound only by the scope of the appended claims.

What is claimed is:

1. Counterbalancing apparatus for an overhead door disposed in an opening defined by a door frame structure, said apparatus comprising:

a torsion shaft mounted for rotation between first and second stationary supports;

a torsion spring having a first end fixed to said torsion shaft so as to allow rotation with said torsion shaft and axial movement along said torsion shaft during raising and lowering of said overhead door, said torsion spring having a second end operatively connected to a winding mechanism for winding said second end of said torsion spring with respect to said first end with said door held stationary, said winding mechanism being mounted to said first stationary support.

2. The counterbalancing apparatus of claim 1 wherein said first end of said torsion spring is connected to a fitting, said fitting having a key slidably received by a keyway in said torsion shaft.

3. The counterbalancing apparatus of claim 2 wherein said keyway comprises a depression in said torsion shaft which extends along the length of said shaft.

4. The counterbalancing apparatus of claim I wherein said first end of said torsion spring is connected to a fitting having an inner portion including rolling elements for reducing friction between said fitting and said torsion shaft.

5. The counterbalancing apparatus of claim 4 wherein said rolling elements ride along axial grooves in an outer surface of said torsion shaft.

6. The counterbalancing apparatus of claim 1 wherein said winding mechanism further comprises:

i) a ring-shaped gear rotatably supported by said first stationary support, said ring-shaped gear being operatively affixed to said second end of said torsion spring such that rotation of said ring-shaped gear rotates the second end of said spring with respect to the first end of said spring; and, ii) a worm drive gear rotatably supported by said mounting structure and including outer teeth meshing with the teeth of said ring-shaped gear.

7. The counterbalancing apparatus of claim 6 further comprising a counting mechanism operatively connected to said ring-shaped gear for counting rotations of said ring-shaped gear.

8. The counterbalancing apparatus of claim 6 wherein said ring-shaped gear further includes a fitting extending from one side thereof, said fitting being connected to the second end of said torsion spring.

9. The counterbalancing apparatus of claim 8 wherein said fitting and said ring-shaped gear are integrally formed with one another.

10. The counterbalancing apparatus of claim 9 wherein said ring-shaped gear is a spur gear.

11. The counterbalancing apparatus of claim 9 further comprising an inner bushing disposed between said torsion shaft and said ring-shaped gear, said bushing being rotatable with said ring-shaped gear about said torsion shaft.

12. The counterbalancing apparatus of claim 6 further comprising a gear retainer which engages said winding mechanism to restrain said ring-shaped gear and said worm drive gear from rotation, said gear retainer being disengageable from said gear system to allow operation of said gear system during winding and unwinding of said torsion spring.

13. The counterbalancing apparatus of claim 12 wherein said gear retainer is a spring clip mounted adjacent to a drive head of said worm drive gear, wherein an aperture of said spring clip receives and engages said drive head so as to normally restrain any rotation of said drive head and said spring clip being movable to a disengaged position by a tool pressed against said drive head.

14. The counterbalancing apparatus of claim 13 wherein said drive head includes a recessed portion defining the disengaged position of said spring clip.

15. The counterbalancing apparatus of claim 6 wherein said ring-shaped gear is a spur gear including outer teeth extending parallel to an axis of rotation thereof wherein the teeth of said worm drive gear are disposed at a lead angle sufficient to drive said spur gear and said axis of rotation of said worm drive gear thereby being offset from perpendicular relative to the axis of rotation of said spur gear by an angular increment substantially equal to said lead angle.

16. Counterbalancing apparatus for an overhead door disposed in an opening defined by a door frame structure, said apparatus comprising:
    a torsion shaft mounted for rotation between first and second fixed supports;
    a torsion spring having a first end fixed to said torsion shaft such that said first end rotates with said torsion shaft but does not move axially along said torsion shaft during raising and lowering of said overhead door, said torsion spring having a second end operatively connected to a winding mechanism for winding said second end with respect to said first end with said door held stationary, said winding mechanism being mounted to one of said first and second fixed supports, said spring being comprised of coils wherein adjacent coils are spaced from one another by a gap when said spring is in an unwound, resting state; and being generally defined by the formula:
    a counting mechanism operatively connected to said winding mechanism for counting windings of said spring.

17. The counterbalancing apparatus of claim 16 wherein said gap is approximately 1/64" to 1/32" wide.

18. The counterbalancing apparatus of claim 16 wherein said winding mechanism comprises a gear system connected to a fixed mounting structure and including:
    i) a ring-shaped gear rotatably supported by said mounting structure, said ring-shaped gear being operatively affixed to said second end of said torsion spring such that rotation of said ring-shaped gear rotates said second end of said spring with respect to said first end of said spring; and,
    ii) a worm drive gear rotatably supported by said mounting structure and including outer teeth meshing with the teeth of said ring-shaped gear.

19. (Amended) The counterbalancing apparatus of claim 18 wherein said counting mechanism is connected to said ring-shaped gear for counting rotations of said ring-shaped gear together with the windings of said spring.

20. The counterbalancing apparatus of claim 18 wherein said ring-shaped gear further includes a fitting extending from one side thereof, said fitting being connected to the second end of said torsion spring.

21. The counterbalancing apparatus of claim 20 wherein said fitting and said ring-shaped gear are integrally formed with one another.

22. The counterbalancing apparatus of claim 21 wherein said ring-shaped gear is a spur gear.

23. The counterbalancing apparatus of claim 21 further comprising an inner bushing disposed between said torsion shaft and said ring-shaped gear, said bushing being rotatable with said ring-shaped gear about said torsion shaft.

24. The counterbalancing apparatus of claim 18 further comprising:
    a gear retainer which engages said gear system and restrains said ring-shaped gear and said worm drive gear from rotation during operation of said overhead door, said gear retainer being disengageable from said gear system to allow operation of said gear system during winding and unwinding of said torsion spring.

25. The counterbalancing apparatus of claim 24 wherein said gear retainer is a spring clip mounted adjacent to a drive head of said worm drive gear, wherein an aperture of said spring clip receives and engages said drive head so as to normally restrain any rotation of said drive head and said spring clip being movable to a disengaged position by a tool pressed against said drive head.

26. The counterbalancing apparatus of claim 25 wherein said drive head includes a recessed portion defining the disengaged position of said spring clip.

27. The counterbalancing apparatus of claim 16 wherein said winding mechanism comprises a gear system connected to a fixed mounting structure and including:
    i) a ring-shaped gear rotatably supported by said mounting structure, said ring-shaped gear being operatively affixed to said second end of said torsion spring such that rotation of said ring-shaped gear rotates said second end of said spring with respect to said first end of said spring; and,
    ii) a worm drive gear rotatably supported by said mounting structure and including outer teeth meshing with the teeth of said ring-shaped gear, said worm drive gear being mounted with respect to said ring-shaped gear between a position in which an axis of rotation of said worm drive gear extends approximately vertically and a position in which said axis of rotation of said worm drive gear extends inwardly at approximately 45° with respect to said door opening.

28. The counterbalancing apparatus of claim 27 wherein said ring-shaped gear is a spur gear including outer teeth extending parallel to an axis of rotation thereof wherein the teeth of said worm drive gear are disposed at a lead angle sufficient to drive said spur gear and said axis of rotation of said worm drive gear thereby being offset from perpendicular relative to the axis of rotation of said spur gear by an angular increment substantially equal to said lead angle.

29. Counterbalancing apparatus for an overhead door disposed in an opening defined by a door frame structure said apparatus comprising:
    a) a torsion shaft;
    b) a torsion spring having a first end fixed to said torsion shaft;
    c) a gear system connected to a fixed mounting structure and operatively coupled to a second end of said torsion spring, said gear system including;

i) a ring-shaped gear rotatably supported by said mounting structure, said ring-shaped gear being operatively affixed to said second end of said torsion spring such that rotation of said ring-shaped gear rotates said second end of said spring with respect to said first end of said spring; and, ii) a worm drive gear rotatably supported by said mounting structure and including outer teeth meshing with the teeth of said ring-shaped gear, said worm drive gear being mounted with respect to said ring-shaped gear between et position in which an axis of rotation of said worm drive gear extends approximately vertically and a position in which said an axis of rotation of said worm drive gear extends inwardly at approximately 45° with respect to said door opening; and a counting mechanism operatively connected to said ring-shaped gear for counting rotations of said ring-shaped gear.

30. Counterbalancing apparatus for an overhead door comprising:

a torsion shaft mounted for rotation between first and second roller bearings held by respective first and second fixed sheet metal supports disposed at opposite ends of said torsion shaft;

a winding mechanism including a ring-shaped gear engaging a worm drive gear and each mounted for rotation to said first fixed support;

a torsion spring receiving said torsion shaft, a first end of said spring being rigidly affixed to said torsion shaft for rotation therewith and a second end of said torsion spring being affixed for rotation with said ring-shaped gear; and, first and second drums rigidly affixed to opposite ends of said torsion shaft for rotation therewith, said first drum at least indirectly bearing against said ring-shaped gear so as to bear a thrust load of said torsion spring when said torsion spring is in a wound state.

31. The counterbalancing apparatus of claim 30, wherein said first roller bearing is mounted to said first support and is disposed between said ring-shaped gear and said first drum, wherein one side of said first roller bearing abuts against said ring-shaped gear and an opposite side of said first roller bearing abuts against said first drum.

32. Counterbalancing apparatus for an overhead door disposed in an opening defined by a door frame structure, said apparatus comprising:

a torsion shaft mounted for rotation between first and second stationary supports;

a torsion spring having a first end fixed to said torsion shaft so as to allow rotation with said torsion shaft;

a winding mechanism connected to a second end of said torsion spring for winding said second end of said torsion spring with respect to said first end with said door held stationary, said winding mechanism being mounted to said first stationary support; and, a counting mechanism operatively connected to said winding mechanism for counting windings of said torsion spring and providing indication of a number of said windings.

33. The counterbalancing apparatus of claim 32 wherein said winding mechanism comprises a gear system connected to a fixed mounting structure and including:

i) a ring-shaped gear rotatably supported by said mounting structure, said ring-shaped gear being operatively affixed to said second end of said torsion spring such that rotation of said ring-shaped gear rotates said second end of said spring with respect to said first end of said spring; and, ii) a worm drive gear rotatably supported by said mounting structure and including outer teeth meshing with the teeth of said ring-shaped gear.

34. The counterbalancing apparatus of claim 32 wherein said counting mechanism comprises a counting gear having teeth in engagement with the of said ring-shaped gear, said counting gear further being operatively coupled to an indicator device which provides indication of a number of rotations of said ring-shaped gear as a function of a number of rotations of said counting gear.

35. The counterbalancing apparatus of claim 34 wherein said counting gear is mounted for translation as well as for rotation and said indicator device includes a pointer mounted for translation with said counting gear and having a portion thereof disposed adjacent a graduated scale for indicating said number of rotations of said ring-shaped gear.

36. The counterbalancing apparatus of claim 35 wherein said counting gear includes an internally threaded, central hub which receives a threaded rod such that rotation of said counting gear about said threaded rod translates said counting gear along said threaded rod.

37. The counterbalancing apparatus of claim 36 wherein said counting mechanism includes a housing for containing said counting gear, said pointer being mounted to said counting gear such that relative rotation is allowed between said pointer and said counting gear, said portion of said pointer extending through an elongated slot in said housing and said graduated scale being disposed outside of said housing adjacent said elongated slot.

38. The counterbalancing apparatus of claim 32, wherein said counting mechanism includes a rotating element which rotates with said ring-shaped gear to indicate the number of rotations of said ring-shaped gear and said spring.

* * * * *

UNITED STATES PATENT AND TRADEMARK OFFICE
CERTIFICATE OF CORRECTION

PATENT NO. : 5,632,063
DATED : May 27, 1997
INVENTOR(S) : Kenneth E. Carper et al.

It is certified that error appears in the above-indentified patent and that said Letters Patent is hereby corrected as shown below:

Column 6, Line 32, "Angle e" should read --Angle a--.

Column 11, Line 64, please delete "(Amended)".

Column 13, Line 11, "between et" should read --between a--.

Column 14, Line 21, "of claim 32" should read --of claim 33--.

Column 14, Line 47, "of claim 32" should read --of claim 33--.

Signed and Sealed this

Twenty-third Day of September, 1997

*Attest:*

BRUCE LEHMAN

*Attesting Officer*   Commissioner of Patents and Trademarks